(12) United States Patent
Russell et al.

(10) Patent No.: US 10,286,304 B2
(45) Date of Patent: May 14, 2019

(54) CONTROLLER HAVING ACCESSORY CONNECTORS FOR EXTERNALIZING CONTROLS

(71) Applicant: Microsoft Technology Licensing, LLC, Redmond, WA (US)

(72) Inventors: Brian G. Russell, Seattle, WA (US); Sam Michael Sarmast, Redmond, WA (US); Robert Bryce Johnson, Sammamish, WA (US); Jonathan Shea Robinson, Kirkland, WA (US); Andre Sutanto, Kenmore, WA (US); Leo Shing, Redmond, WA (US); Ross Nelson, Seattle, WA (US); Christopher Kujawski, Seattle, WA (US); Evelyn Thomas, Bellevue, WA (US); Kristine A. Hunter, Seattle, WA (US); Flor Albornoz, Las Vegas, NV (US); Rachel Yang, Leonia, NJ (US); Christopher Harmon, Cambridge, MA (US); Gregory M. Daly, Seattle, WA (US); Matthew Edward Hite, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 42 days.

(21) Appl. No.: 15/449,861

(22) Filed: Mar. 3, 2017

(65) Prior Publication Data

US 2018/0056180 A1   Mar. 1, 2018

Related U.S. Application Data

(60) Provisional application No. 62/381,508, filed on Aug. 30, 2016.

(51) Int. Cl.
 *A63F 13/23* (2014.01)
 *A63F 13/24* (2014.01)
 (Continued)

(52) U.S. Cl.
 CPC .............. *A63F 13/23* (2014.09); *A63F 13/24* (2014.09); *A63F 13/42* (2014.09); *A63F 13/537* (2014.09);
 (Continued)

(58) Field of Classification Search
 CPC ....... A63F 13/24; A63F 13/245; A63F 13/323
 (Continued)

(56) References Cited

U.S. PATENT DOCUMENTS

| 4,518,164 A | 5/1985 | Hayford |
| 5,896,125 A | 4/1999 | Niedzwiecki |

(Continued)

OTHER PUBLICATIONS

Adroit Switchblade 2 Controller Review: A do-it-all controller for disabled gamers, 2015 https://www.gamingcontrollersforyou.com/adroit-switchblade-2-controller-review-a-do-it-all-controller-for-disabled-gamers.*

(Continued)

*Primary Examiner* — Omkar A Deodhar
*Assistant Examiner* — Ross A Williams
(74) *Attorney, Agent, or Firm* — Alleman Hall Creasman & Tuttle LLP

(57) ABSTRACT

An accessory apparatus includes a housing, an apparatus connector, a plurality of auxiliary accessory interfaces, and an internal microcontroller. The connection connector is configured to mate with a corresponding accessory connector of a physical controller to electrically connect the internal microcontroller to the physical controller. Each auxiliary accessory connector is configured to enable a separate auxiliary user input device to operatively connect to the (Continued)

accessory apparatus and electrically connect with the internal microcontroller. The internal microcontroller is configured to: (1) receive an input control signal from an auxiliary user input device operatively connected to an auxiliary accessory connector of the plurality of auxiliary accessory connectors, (2) map the input control signal to a mapped control signal corresponding to a physical control of the physical controller, and (3) send the mapped control signal to the physical controller via the apparatus connector.

20 Claims, 8 Drawing Sheets

(51) Int. Cl.

| | | |
|---|---|---|
| *A63F 13/42* | (2014.01) | |
| *A63F 13/537* | (2014.01) | |
| *A63F 13/98* | (2014.01) | |
| *G06F 3/02* | (2006.01) | |
| *G06F 3/023* | (2006.01) | |
| *G06F 3/038* | (2013.01) | |
| *H04B 1/3827* | (2015.01) | |

(52) U.S. Cl.
CPC ............ *A63F 13/98* (2014.09); *G06F 3/0202* (2013.01); *G06F 3/023* (2013.01); *G06F 3/0227* (2013.01); *G06F 3/0238* (2013.01); *G06F 3/038* (2013.01); *H04B 1/3833* (2013.01)

(58) Field of Classification Search
USPC ..................................................... 463/30–37
See application file for complete search history.

(56) References Cited

U.S. PATENT DOCUMENTS

| | | | |
|---|---|---|---|
| 8,529,357 B2* | 9/2013 | Joynes ................. | G06F 3/0219 463/36 |
| 8,560,752 B2 | 10/2013 | Liberty | |
| 2002/0142838 A1 | 10/2002 | Russell | |
| 2006/0246969 A1* | 11/2006 | Penello ................ | G11B 17/056 463/1 |
| 2007/0066394 A1* | 3/2007 | Ikeda ..................... | A63F 13/06 463/37 |
| 2010/0075756 A1* | 3/2010 | Roberts ................. | A63F 13/10 463/39 |
| 2010/0267454 A1 | 10/2010 | Navid | |
| 2011/0081969 A1* | 4/2011 | Ikeda .................... | A63F 13/235 463/37 |
| 2013/0281213 A1* | 10/2013 | Yasuda ................... | A63F 13/42 463/39 |

OTHER PUBLICATIONS

"International Search Report and Written Opinion Issued in PCT Application No. PCT/US2017/048295", dated Nov. 28, 2017, 12 Pages.

"Game Box Controllers", Retrieved on: Aug. 30, 2016 Available at: http://rjcooper.com/game-controller/.

Raphy, "Adroit Switchblade 2 Controller Review: A do-it-all controller for disabled gamers Controllers", Published on: Jul. 21, 2015 Available at: http://gamingcontrollersforyou.com/adroit-switchblade-2-controller-review-a-do-it-all-controller-for-disabled-gamers.

Ellis, Barrie, "Physical Barriers in Video Games", Published on: Mar. 20, 2006 Available at: https://www.google.co.in/url?sa=t&rct=j&q=&esrc=s&source=web&cd=2&cad=rja&uact=8&ved=0ahUKEwjLtMmG-ejOAhXEMY8KHVTmCtAQFggiMAE&url=http%3A%2F%2Foneswitch.org.uk%2F%2FDOWNLOADS%2FPhysical_Barriers.doc&usg=AFQjCNGtaaHO_q9CI4QdfEJmLL1e-E9XSQ&bvm=bv.131286987,d.c2I.

"Physical disability: games & controllers", Published on: Sep. 20, 2015 Available at: http://game-accessibility.com/documentation/physical-disability-games-controllers/.

"5 Ability Switch Digital Joystick Mini Din 6-Pin Adapter for Motorized Camera Tripod Head and Switch Enabled Ergonomic One-Handed Game Controller", Published on: Apr. 10, 2015 Available at: http://www.broadenedhorizons.com/5-ability-switch-adapter-for-minidin6-digital-joysticks.

"Beating physical disability to enjoy video games", Retrieved on: Aug. 30, 2016 Available at: http://www.specialeffect.org.uk/.

Iacopetti, et al., "Game Console Controller Interface for People with Disability", In Proceedings of International Conference on Complex, Intelligent and Software Intensive Systems, Mar. 4, 2008, pp. 757-762.

"Set up and troubleshoot your Xbox One Stereo Headset", Retrieved on: Aug. 30, 2016 Available at: http://support.xbox.com/en-IN/xbox-one/accessories/stereo-headset-set-up-troubleshoot.

Kraft, Caleb, "Building Custom Game Controllers for People with Physical Disabilities Headset", Published on: Jun. 20, 2013 Available at: http://hackaday.com/2013/06/20/building-custom-game-controllers-for-people-with-physical-disabilities/.

* cited by examiner

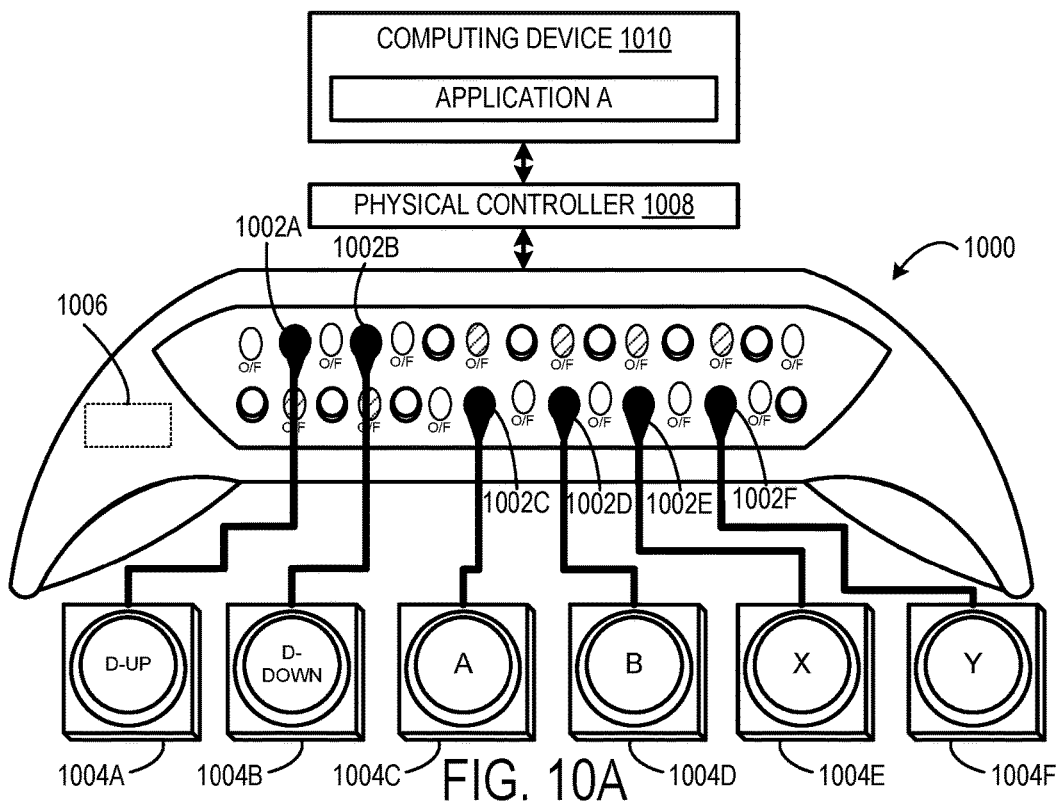
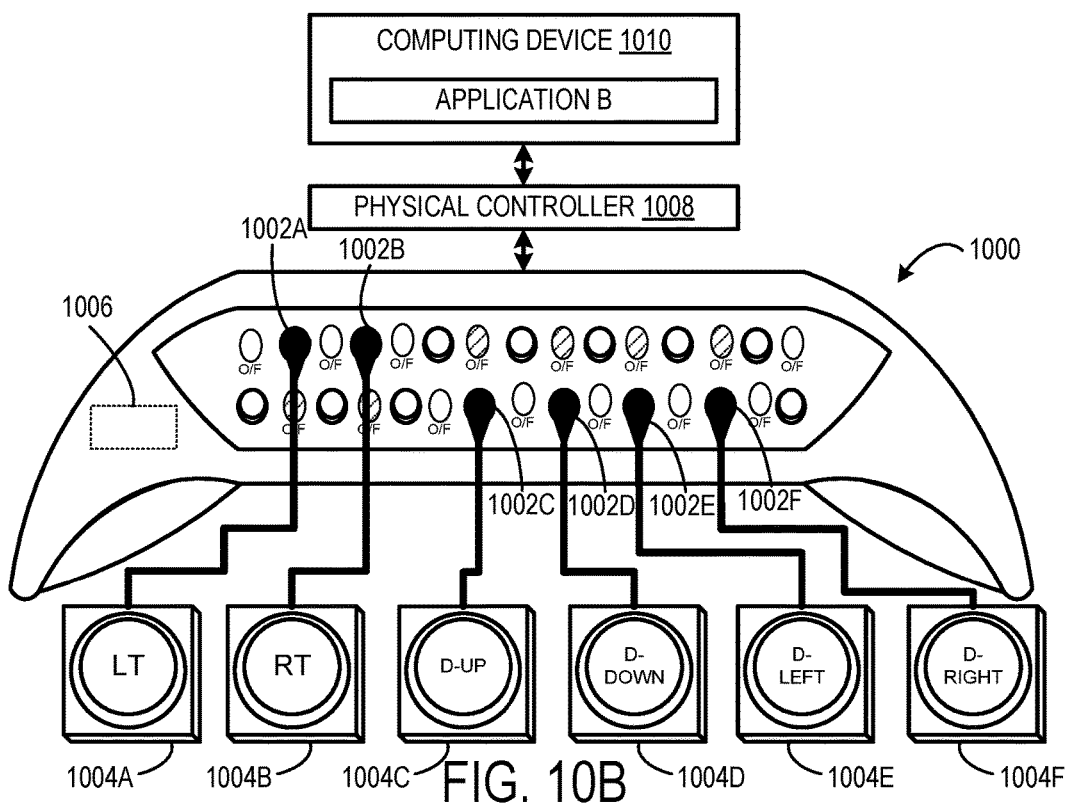

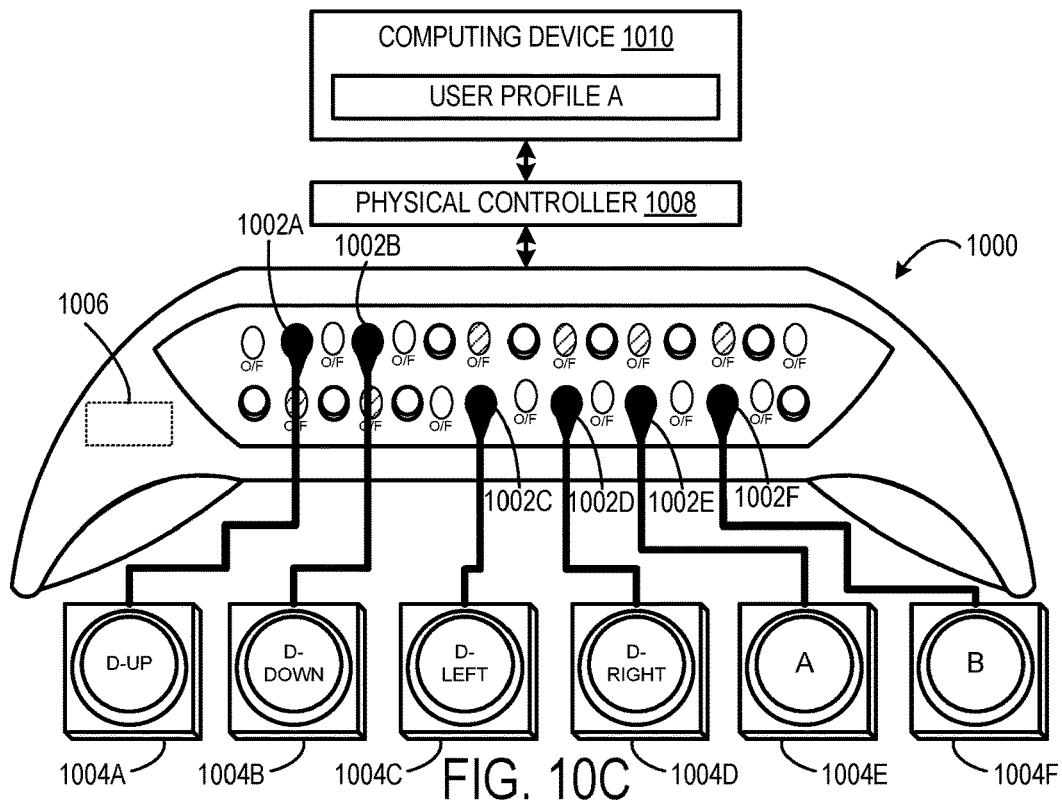
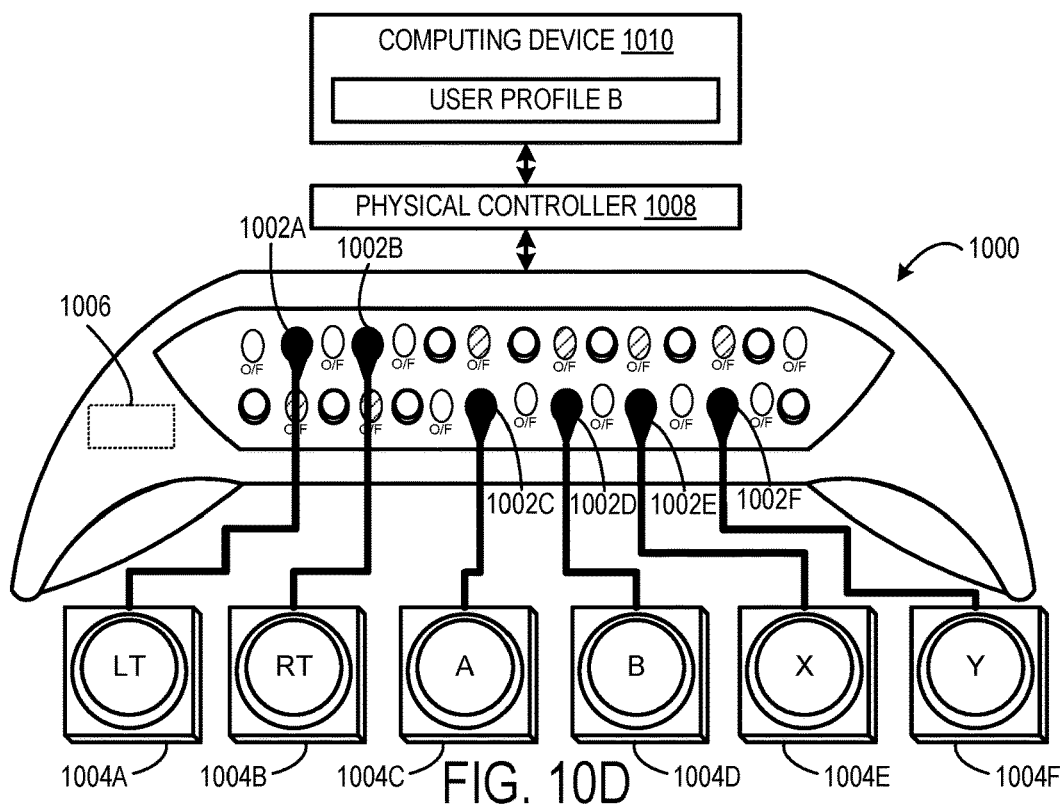

CONTROLLER HAVING ACCESSORY CONNECTORS FOR EXTERNALIZING CONTROLS

CROSS REFERENCE TO RELATED APPLICATIONS

This application claims priority under 35 U.S.C. 119(e) to U.S. Provisional Patent Application No. 62/381,508, filed Aug. 30, 2016, the entirety of which is hereby incorporated herein by reference.

BACKGROUND

A physical controller may be used to provide user input to control an application executed by a computing device, such as an object or a character in a video game, or to provide some other form of control. A physical controller may include various types of physical controls that may be configured to be physically manipulated by a user to provide different types of user input. Non-limiting examples of such physical controls include push buttons, triggers, touch pads, joysticks, paddles, bumpers, and directional pads. The various physical controls may be physically manipulated, and the physical controller may send control signals to a computing device based on such physical manipulation to effect control of an application executed by the computing device, for example.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An accessory apparatus includes a housing, an apparatus connector, a plurality of auxiliary accessory interfaces, and an internal microcontroller. The connection connector is configured to mate with a corresponding accessory connector of a physical controller to electrically connect the internal microcontroller to the physical controller. Each auxiliary accessory connector is configured to enable a separate auxiliary user input device to operatively connect to the accessory apparatus and electrically connect with the internal microcontroller. The internal microcontroller is configured to: (1) receive an input control signal from an auxiliary user input device operatively connected to an auxiliary accessory connector of the plurality of auxiliary accessory connectors, (2) map the input control signal to a mapped control signal corresponding to a physical control of the physical controller, and (3) send the mapped control signal to the physical controller via the apparatus connector.

BRIEF DESCRIPTION OF THE DRAWINGS

FIGS. 10A and 10B show an example accessory apparatus connected to a set of auxiliary user input devices mapped to different application-specific sets of physical controls.

FIGS. 10C and 10D show an example accessory apparatus connected to a set of auxiliary user input devices mapped to different user-specific sets of physical controls.

DETAILED DESCRIPTION

A physical controller or other user input control device may be used to provide user input to control a character or other object in a video game, or to provide some other form of control over a software application executed by a computing device. A game controller or other physical controller may be shaped/sized to fit what is assumed to be an "average" user hand, e.g., a hand of average size/proportion for an anticipated population of users. Likewise, when controls configured to be physically manipulated are included (e.g., push buttons, triggers, joysticks, directional pads), they typically are designed using a "one size fits all" approach. However, hands of course vary in size and proportion from user to user, and users may have varying preferences when it comes to holding a physical controller and manipulating its controls. In some cases, a user may be unable to hold/operate a physical controller shaped/sized for an average population of users, for example due to a temporary or permanent disability.

The present disclosure is directed to a physical controller having customizable features that allow different users to interact with the physical controller in a desired way based on the capabilities/preferences of those users. In some implementations, the physical controller includes an accessory connector configured to affix an accessory apparatus to the physical controller. In some examples, the accessory apparatus includes a plurality of auxiliary accessory connectors. These connectors enable separate user input devices (e.g., individual buttons, joysticks, touch pads, sip and puff device) to be connected to the accessory apparatus. When the accessory apparatus is affixed to the physical controller, and when the auxiliary user input devices are connected to the auxiliary accessory connectors of the accessory apparatus, the accessory apparatus acts as an intermediary translator. In particular, the accessory apparatus maps input control signals received from the auxiliary user input device to mapped control signals corresponding to the physical controls of the physical controller. Accordingly, the auxiliary user input devices may be used to provide the same control signal as the physical controls of the physical controller. Such a configuration allows a user that is unable to manipulate the physical controls of the physical controller to obtain the same functionality in an alternative manner (i.e., through a physical action that varies from what normally is required to manipulate a given physical control on the physical controller).

Figure 1:
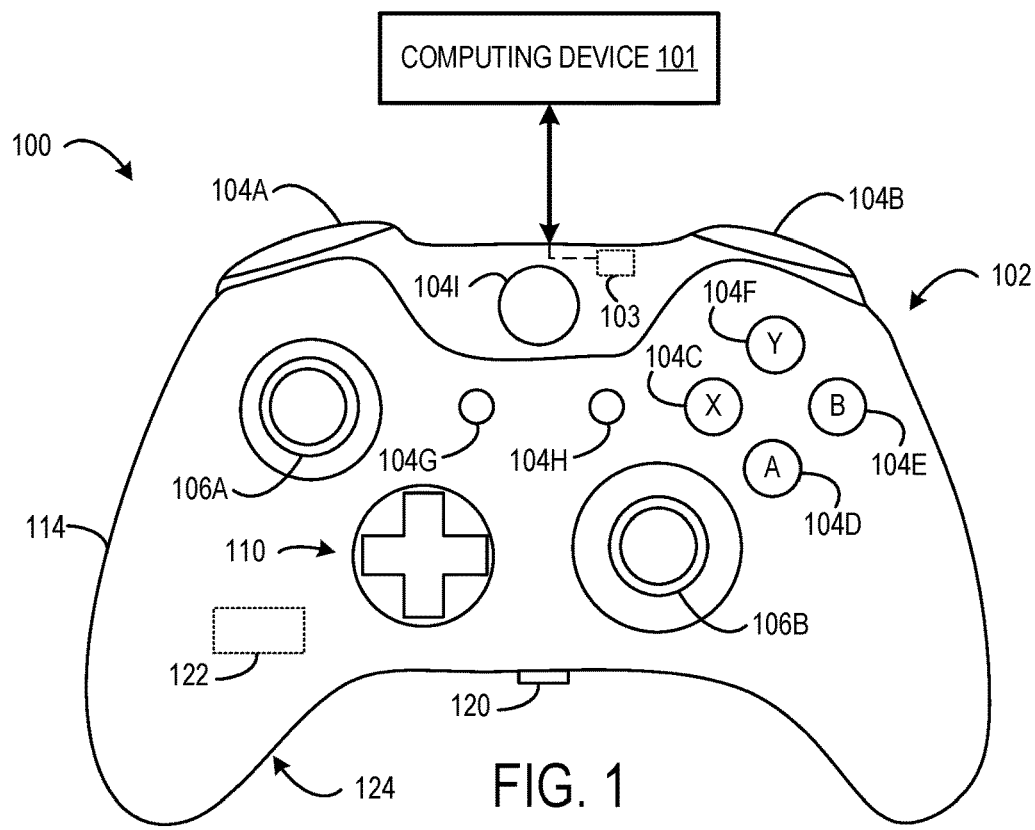
FIG. 1 shows an upward-facing portion of an example physical controller.
Figure 2:
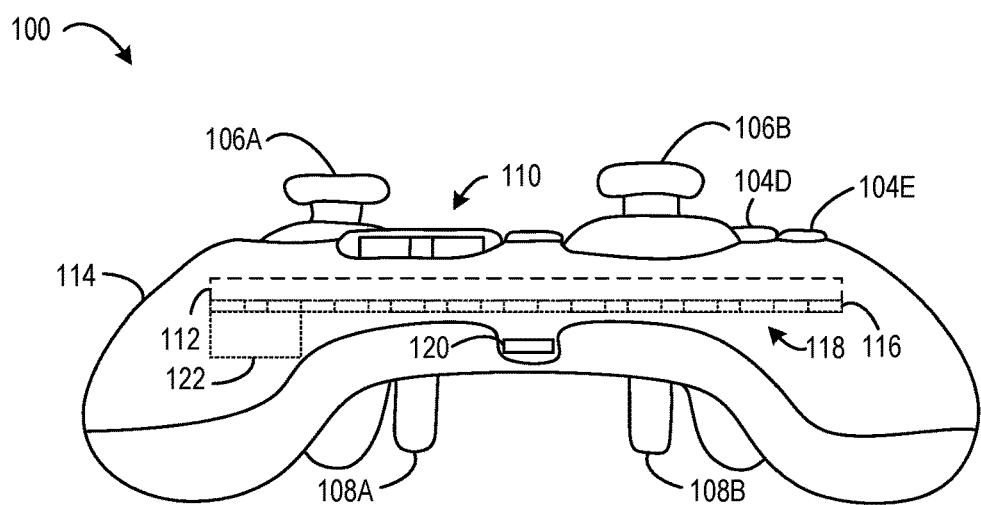
FIG. 2 shows a rearward-facing portion of the physical controller of FIG. 1

FIGS. 1 and 2 show an example user input device or physical controller in the form of a game controller 100. The game controller 100 is configured to translate user input into control signals. These control signals are provided to a computing device 101, such as a gaming console. The game controller 100 includes a communication interface 103 configured to communicatively couple the game controller 100 with the computing device 101 to control an application executed by the computing device 101. For example, the communication interface 103 may include a wired or wireless connection with the computing device 101. The communication interface 103 may include any suitable communication hardware to enable communication according to any suitable communication protocol (e.g., Wi-Fi, Bluetooth).

The control signals may be mapped to commands to control a video game or any other application, or to perform any other computing operations The computing device 101 and/or the game controller 100 may be configured to map different control signals to different commands based on settings of the computing device 101, the game controller 100, a particular application being executed by the computing device 101, and/or a particular identified user that is controlling the game controller 100/computing device 101.

In some implementations, the game controller 100 may be configured to map (or remap) control signals to commands and send the commands to the computing device 101. In other words, the mapping of control signal to commands may be performed locally (e.g., on-board the game controller 100).

The game controller 100 includes a plurality of physical controls 102 configured to generate different control signals responsive to physical manipulation. In particular, the physical controls 102 may include a plurality of action buttons 104 (e.g., 104A, 104B, 104C, 104D, 104E, 104F, 104G, 104H, and 104I), a plurality of joysticks 106 (e.g., a left joystick 106A and a right joystick 106B), a plurality of triggers 108 (e.g., a left trigger 108A and a right trigger 108B), and a directional pad 110. The game controller 100 may include any number of physical controls, any type of physical controls, any number of electronic input sensors, and any type of electronic input sensors without departing from the scope of this disclosure.

Physical controls 102 may be coupled to one or more frames 112. The frame 112 may be contained in a housing 114 of the game controller 100. One or more printed circuit boards 116 may be coupled to the one or more frames 112. Although a single printed circuit board is depicted, in some implementations, two or more printed circuit boards may be employed in the game controller 100. The printed circuit board 116 may include a plurality of electronic input sensors 118. Each electronic input sensor 118 may be configured to generate an activation signal responsive to interaction with a corresponding physical control 102. Non-limiting examples of electronic input sensors include dome switches, tactile switches, Hall Effect sensors, potentiometers, and other electronic sensing components. Any suitable sensor may be implemented in the game controller 100.

Each of the action buttons 104 may be configured to activate a corresponding electronic input sensor 118, to generate an activation signal responsive to being depressed (e.g., via physical manipulation). Each of the joysticks 106 may be configured to provide two-dimensional input that is based on a position of the joystick in relation to a default "center" position. For example, the joysticks may interact with electronic input sensors in the form of potentiometers that use continuous electrical activity to provide an analog input control signal. Each of the triggers 108 may be configured to provide a variable activation signal based on a position of the trigger relative to a default position. For example, as a trigger is pulled farther away from the default position a characteristic of the generated control signal may increase in magnitude.

The directional pad 110 may be configured to reside in a default posture when no touch force is applied to the directional pad 110. In the default posture, the directional pad 110 does not cause any of the plurality of electronic input sensors 118 to generate an activation signal. Further, the directional pad 110 may be configured to move from the default posture to a selected activation posture responsive to a touch force being applied to the directional pad 110. The selected activation posture may be one of multiple different activation postures that each generate a different activation signal, or a combination of activation signals, by interfacing with different electronic input sensors.

Note that an activation signal produced by an electronic input sensor 118 when a corresponding control 102 is in an activation posture may be any signal that differs from a signal or lack thereof produced by the electronic input sensor 118 in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100.

In the depicted implementation, the directional pad 110 can be depressed in four different directions (e.g., up, down, left, and right) to interface with different electronic input sensors that generate different activation signals. In some implementations, the four different directions may correspond to four different activation postures that generate four different activation signals to provide four-way directional input. In some implementations, combinations of activation signals corresponding to pressing the directional pad 110 in two directions (e.g., up and left) at one time may be interpreted as additional activation postures corresponding to diagonals in between the four directions to provide eight-way directional input. In some implementations, the directional pad 110 may include a number of directions different than four or eight. For example, the directional pad 110 may include two or more different directions.

The housing 114 includes one or more grips 124 configured to be gripped by a hand. In particular, the grips 124 are shaped like a bulbous protrusion that contours to a palm of a human hand. The grips 124 allow the game controller 100 to be held by one or more hands such that the physical controls 102 may be physically manipulated.

The game controller 100 includes an integrated microcontroller 122 configured to receive activation signals from the plurality of physical controls 102, and send control signals corresponding to the activation signals to the computing device 101, via the communication interface 103, to control the application executed by the computing device 101. In some implementations, the integrated microcontroller 122 may be configured to map control signals generated from different physical controls of the game controller 100 to different commands or functions based on different operating conditions of the computing device 101 and/or the game controller 100. The integrated microcontroller 122 may be configured to map any suitable control of the game controller 100 to any suitable function based on any suitable operating condition.

The game controller 100 includes an accessory connector 120 configured to electrically connect an accessory apparatus, such as an accessory apparatus 300 shown in FIGS. 3-6, with the game controller 100. In particular, the accessory connector 120 is configured to mate with a corresponding apparatus connector 312 of the accessory apparatus 300 to enable the electrical connection. The electrical connection further enables communication between the integrated microcontroller 122 and an internal microcontroller 308 of the accessory apparatus 300. Furthermore, the accessory connector 120 and the apparatus connector 312 may be collectively configured to enable the accessory apparatus 300 to removably affix to the game controller 100.

The accessory connector 120 may include electrical and mechanical features that enable electrical and mechanical connections to be made between the accessory apparatus 300 and the game controller 100. In some implementations, the accessory connector 120 may enable the game controller 100 to provide power to the accessory apparatus 300 or vice versa. In one example, the accessory connector 120 includes one or more electrically-conductive contacts that align with complimentary electrically-conductive contact(s) of the apparatus connector 312 to facilitate one-way and/or two-way control signals to be passed between the game controller 100 and the accessory apparatus 300. In one example, the accessory connector 120 may include a universal serial bus (USB) receptacles, sockets, or plugs to enable two-way communication between the external accessory and the game controller 100. Other detachable connectors are also envisioned, and accessory connector 120 is in no way limited to USB receptacles or plugs. For example, the accessory connector 120 may include a socket configured to accept a wire that connects the accessory apparatus 300 with the game controller 100.

In some implementations, the accessory connector 120 may provide a mounting platform with which the accessory apparatus 300 may align to affix the accessory apparatus 300 to the game controller 100. For example, the accessory connector 102 may include one or more openings sized and shaped to mechanically mate with complimentary protrusion(s) of the accessory apparatus 300, and/or the apparatus connector 120 may include one or more protrusions sized and shaped to mechanically mate with complimentary opening(s) of the accessory apparatus 300. Electrically conductive contacts, when included, may be located on the orifices and/or extensions of the accessory connector 120.

In some implementations, the accessory connector 120 may be configured to connect with a variety different accessory apparatuses having different functionality interchangeably in order to extend the functionality of game controller 100 in different ways. In other implementations, the accessory connector 120 may be specifically configured to electrically connect with the accessory apparatus 300 shown in FIGS. 3-6. The accessory connector 120 may take any suitable form.

Figure 3:
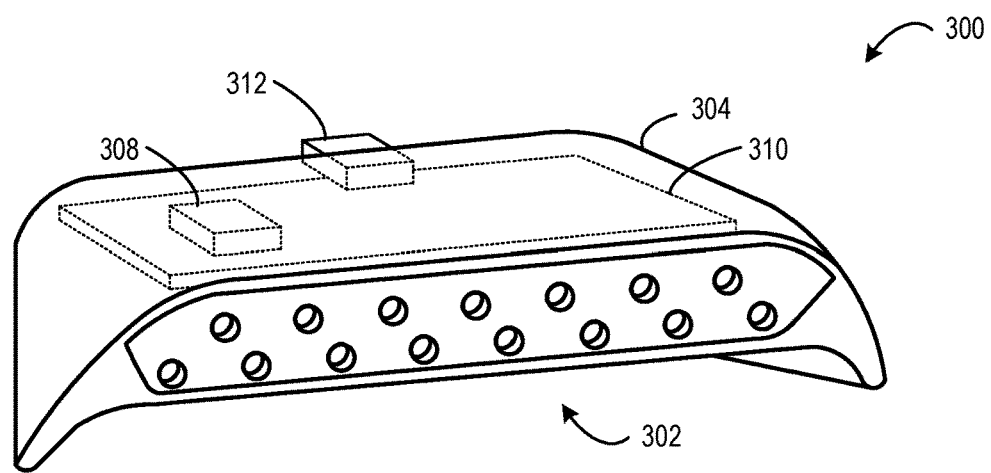
FIG. 3 shows an isometric view showing a rearward-facing portion of an example accessory apparatus configured to be affixed to the physical controller of FIG. 1.

FIGS. 3-6 show the accessory apparatus 300 configured to removably affix to the game controller 100 to externalize functionality of various physical controls 102 of the game controller 100 to separate auxiliary user input devices. FIG. 3 shows an isometric view showing a rearward-facing portion of the accessory apparatus 300 including a plurality of auxiliary accessory connectors 302 encased in a housing 304 of the accessory apparatus 300 and exposed to the exterior environment. Each auxiliary accessory connector 302 is configured to enable a separate auxiliary user input device 304 (e.g., 304A, 304B, 304C shown in FIG. 6) to operatively connect with the accessory apparatus 300. Non-limiting examples of such auxiliary user input devices include a single button, group of buttons, joystick, directional pad, paddle, trigger device, roller ball, sip and puff device, and gaze tracking device.

The accessory apparatus 300 includes an internal microcontroller 308 contained within the housing 304, which is electrically connected to each of the auxiliary accessory connectors 302. In particular, the internal microcontroller 308 in this example is mounted to a circuit board 310 within the housing 304, and the internal microcontroller 308 is electrically connected to the plurality of auxiliary accessory connectors 302 via the circuit board 310. As indicated, the apparatus connector 312 may further be mounted to the circuit board 310 and electrically connected to the internal microcontroller 308.

Figure 4:
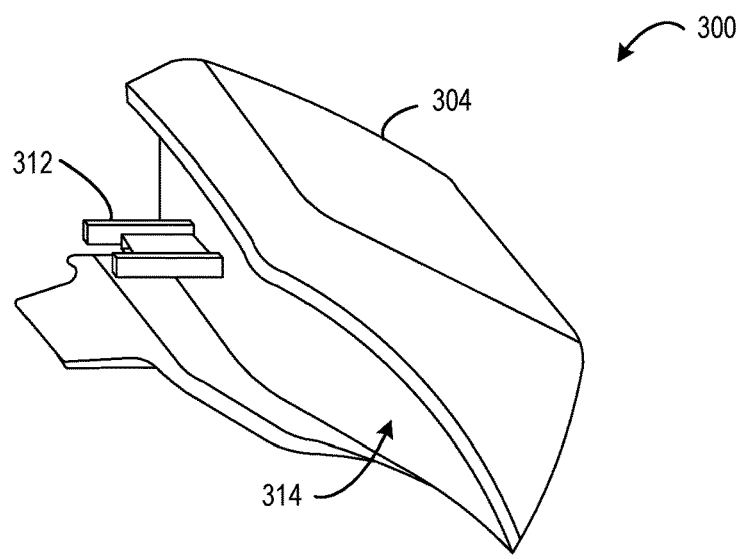
FIG. 4 shows an isometric view of the accessory apparatus of FIG. 3, with a connector on its forward-facing portion enabling the accessory apparatus to be connected to the rearward-facing portion of the physical controller of FIG. 2.

FIG. 4 shows an isometric view of the accessory apparatus 300, with an apparatus connector 312 on its forward-facing portion enabling the accessory apparatus 300 to be connected to the rearward-facing portion of the physical controller 100 of FIG. 2.

In particular, the apparatus connector 312 is configured to mate with the corresponding accessory connector 120 of the game controller 100 to electrically connect the internal microcontroller 308 to the integrated microcontroller 122 of the game controller 100. Such electrical connection enables communication between the game controller 100 and the accessory apparatus 300. The apparatus connector 312 may be encased in the housing 304 and exposed to the external environment to allow such mating. Further, the housing 304 may be shaped to cooperate with a form factor of the game controller 100 to allow the accessory apparatus 300 to combine with the game controller 100 in a non-intrusive manner. In particular, the housing 304 may include depressions 314 that correspond to the bulbous shape of the grips 124 of the game controller 100 such that the housing 314 of the accessory apparatus partially wraps around the grips 124, to help affix the accessory apparatus 300 to the game controller 100.

Figure 5:
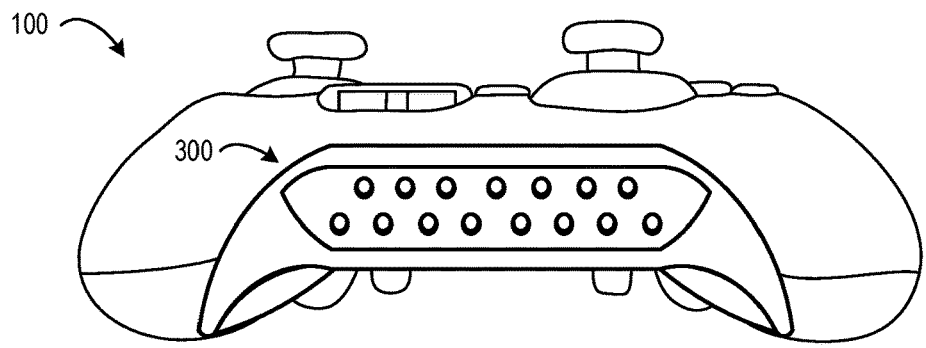
FIG. 5 shows the physical controller of FIG. 1 with the accessory apparatus of FIG. 3 affixed to the rearward-facing portion of the physical controller.
Figure 6:
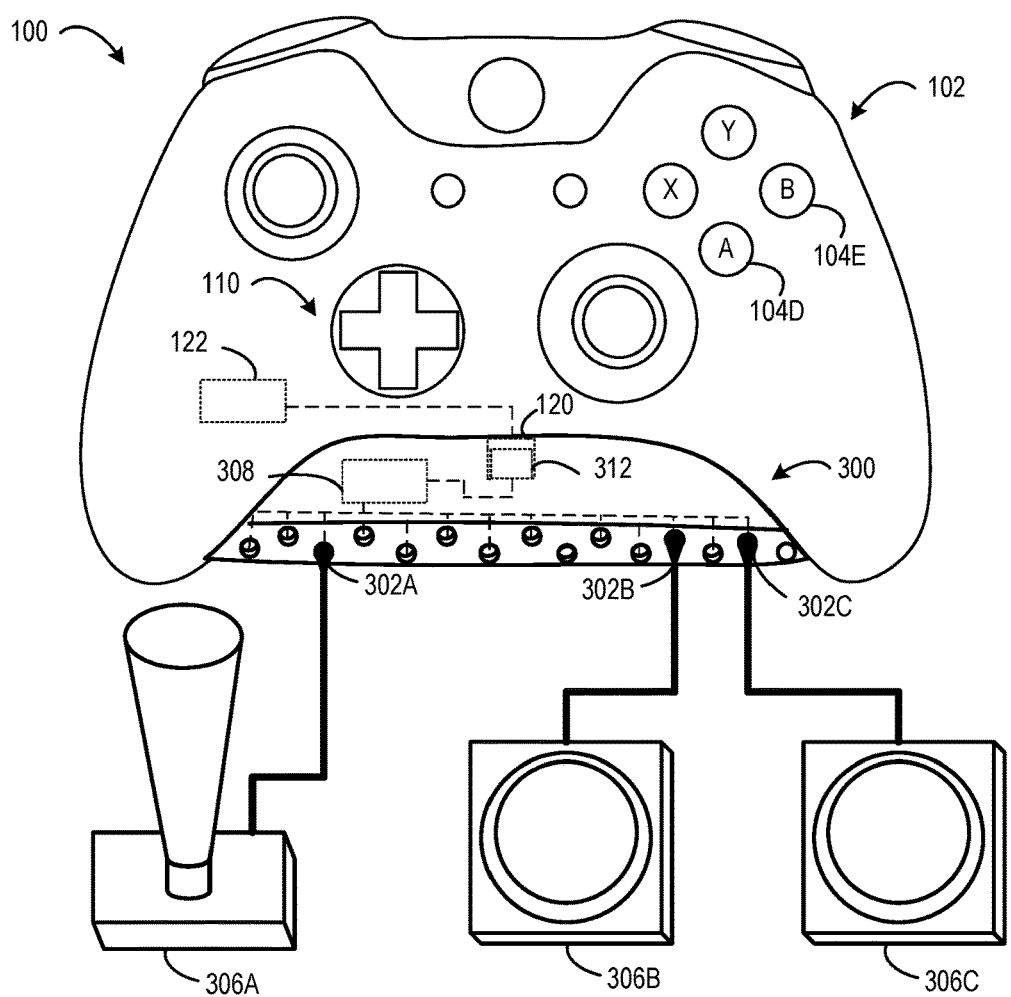
FIG. 6 shows the upward-facing portion of the physical controller of FIG. 1 with the accessory apparatus of FIG. 3 affixed to the physical controller and a plurality of auxiliary user input devices connected to the accessory apparatus.

FIGS. 5 and 6 show the accessory apparatus 300 affixed to the game controller 100. FIG. 6 further shows the plurality of auxiliary user input devices 306 affixed to the accessory apparatus 300. The accessory apparatus 300 may be configured to electrically connect with any suitable type of auxiliary user input device. For example, such auxiliary user input devices may be configured to allow a user having limited/diminished physical abilities to control the auxiliary user input devices when the user would otherwise be unable to control the physical controls on the physical controller. Such a user may be unable to physically manipulate the physical controls of the physical controller, which is designed for an average user, due to having any sort of limited abilities (range of motion, strength, flexibility, etc.)

In the illustrated example, a joystick 306A is connected to the auxiliary accessory connector 302A, a first "big button" device 306B is connected to the auxiliary accessory connector 302B, and a second big button device 306C is connected to the auxiliary accessory connector 302C. The big button devices 306B and 306C may be enlarged/oversized buttons that are easier to press than the smaller buttons on the physical controller. The auxiliary accessory connectors 302 may take any suitable form. In the implementation shown in FIGS. 3-6, the auxiliary accessory connectors 302 are depicted as 3.5 mm jacks. In other implementations, the auxiliary accessory connectors may include USB ports. In some implementations, the auxiliary accessory connectors may be wired or wireless. For example, the auxiliary accessory interfaces may enable the auxiliary user input devices 306 to connect with the accessory apparatus 300 via a wireless radio link (e.g., Bluetooth).

The accessory apparatus 300 may include any suitable number of auxiliary accessory connectors 302 to connect to any suitable number of auxiliary user input devices 306. Moreover, any suitable number of auxiliary user input devices may be operatively connected to the external accessory at a time. For example, the depicted accessory apparatus includes 15 different auxiliary accessory connectors, and anywhere from 0 to 15 auxiliary input devices may be connected to the accessory apparatus 300 at any one time. Further, any suitable number of auxiliary user input devices 306 may correspond to any suitable number of physical controls of the game controller 100.

When the accessory apparatus 300 is affixed to the game controller 100 and when the plurality of auxiliary input devices 306 are connected to the accessory apparatus 300, the internal microcontroller 308 is configured to act as an intermediary translator. In particular, the internal microcontroller 308 is configured to receive an input control signal from a connected auxiliary user input device and map the input control signal to a mapped control signal corresponding to a physical control of the plurality of physical controls 102 of the game controller 100.

The input control signals and the mapped control signals may take any suitable form. For example, the input control signal may be any signal that differs from a signal produced by the auxiliary user input device when in a default posture. For example, in some implementations, the input control signal may correspond to a designated voltage (e.g., VDD) and the signal produced in the default state may correspond to a relative ground. (e.g., 0). In other implementations, the input control signal may correspond to a relative ground and the signal produced in the default state may correspond to the designated voltage. Further, the mapped signals may correspond to any activation signal produced by any of the physical controls 102 of the game controller 100.

The internal microcontroller 308 may be configured to map the input control signals to the mapped control signals according to any suitable mapping scheme. In some implementations, the internal microcontroller 308 is configured to map the auxiliary accessory connectors 302 to particular physical controls 102 of the game controller 100 according to a fixed mapping scheme. In other words, a particular auxiliary accessory connector 302 might always be mapped to a particular physical control 102. And in such an example this mapping would be the case regardless of the particular auxiliary user input device 306 plugged into the connector 302, and regardless of the other active auxiliary accessory connectors 302 of the accessory apparatus 300.

In one example, the input control signal generated by each auxiliary user input device 306 may be mapped to a mapped control signal associated with a different physical control 102 of the game controller 100. In the depicted example, the joystick 306A is mapped to the directional pad 110, the first big button device 306B is mapped to the "A" button 104D, and the second big button device 306C is mapped to the "B" button 104E. In another example, two different auxiliary user input devices may be mapped to the same physical control 102 of the game controller 100. For example, two different auxiliary big button devices may be mapped to the same integrated "A" button of the game controller. Further still, activation of different auxiliary user input devices may correspond, via varying mapped control signals, to different functions of the same integrated control. For example, a first big button device may be mapped to an "UP" direction of the directional pad 110, and a second big button device may be mapped to a "DOWN" direction of the directional pad 110.

In other implementations, the internal microcontroller 308 is configured to map input control signals to mapped control signals based on a dynamic mapping scheme. The internal microcontroller 308 may determine the dynamic mapping scheme based on different operating conditions.

In some implementations, the internal microcontroller 308 is configured to determine the dynamic mapping scheme based on a particular set of active auxiliary connectors. An auxiliary accessory connector is considered active when an auxiliary user input device is plugged into the auxiliary accessory connector. For example, the internal microcontroller 308 may detect a signal or lack thereof via the auxiliary accessory connector to determine whether an auxiliary input device is plugged into the auxiliary accessory connector. In some such examples, the internal microcontroller 308 is configured to recognize the type of auxiliary user input devices that are connected to the active connectors, and dynamically map those devices to particular physical controls based on the type of devices that are connected. For example, if an analog auxiliary user input device, such as a joystick, trigger device, or a sip and puff device, is connected along with multiple big button devices, then the internal microcontroller 308 may map the auxiliary analog device to a corresponding physical control such as the trigger or joystick of the game controller. Further, the internal microcontroller 308 may map the big button devices to corresponding binary physical controls of the game controller, such has the A, B, X, or Y buttons. In another example, if only big button devices are connected, then the internal microcontroller 308 may map some of the big button devices to different directional physical controls (e.g., up, down, left, right of directional pad) and some of the big button devices to binary physical controls of the game controller.

In some implementations, the internal microcontroller 308 is configured to determine the dynamic mapping scheme based on a particular application being executed by the computing device 101 in communication with the game controller 100. Non-limiting examples of application-specific dynamic mapping are discussed in further detail below with reference to FIGS. 10A and 10B.

In some implementations, the internal microcontroller 308 is configured to determine the dynamic mapping scheme based on a user profile of a particular user interacting with the game controller 100. Non-limiting examples of user-specific dynamic mapping are discussed in further detail below with reference to FIGS. 10C and 10D. It will be appreciated that the internal microcontroller 308 may map the input controls to the mapped control signal according to any suitable mapping scheme.

In some implementations, the internal microcontroller 308 is configured to determine the dynamic mapping scheme based on a control signal received from an auxiliary user input device. In particular, the internal microcontroller 308 is configured to receive, via an auxiliary accessory connector, a setup control signal from an auxiliary user input device plugged into the connector. The internal microcontroller 308 is further configured to map subsequently-received input control signals from the auxiliary user input device based on the setup control signal. The setup control signal received from the auxiliary user input device may define different mapping characteristics that may be used by the internal microcontroller 308 to perform the mapping. In one example, the setup control signal defines the physical control(s) to which the auxiliary user input device is to be mapped. In one example scenario, a setup control signal specifies that the four controls corresponding to the different directions of the directional pad (up, down, left, right) are mapped to two auxiliary accessory connectors that are connected to two single-axis joysticks. In this example, each joystick maps to two direction of the directional pad. In another example, a control signal specifies that the four controls corresponding to the different directions of the directional pad are mapped to four different big button devices.

In another example, the setup control signal designates the activation/default signals of the auxiliary user input device. For example, an auxiliary user input device, such as a big button device, may be operated in an unpressed default posture or a depressed default posture as desired by the user, and the setup control signal may indicate which default posture is to be used by the internal microcontroller 308 for mapping purposes.

In another example, an auxiliary joystick device may be operated with one or more inverted axes (e.g., moving the joystick up is interpreted as moving the joystick down, moving the joystick left is interpreted as moving the joystick right, and vice versa), and the setup control signal may indicate which axes of the joystick are inverted for mapping purposes. The setup control signal may map any physical axis of a joystick to any logical axis. For example, if a user is not able to move a joystick up/down and is relegated to up/left or down/left, then the setup control signal may map the up/left to up and the up/right to down.

In another example, an auxiliary user input device may provide a setup control signal that specifies input control signal filtering characteristics. For example, some auxiliary user input devices may be configured to adaptively filter user input to the device to compensate for stability issues (e.g., tremors) of the user. Such devices may indicate the type of filtering that is being used in the setup control signal. Further, the device may be configured to dynamically adjust the filtering based on trajectory predictions, for example, and such adjustments may be dynamically communicated to the accessory apparatus via another setup control signal. In other implementations, input filtering may be performed via an application executed by the computing device 101. For example, the application may prompt the user to provide user input via the device while the application adjusts the filtering of the user input until the user is able to control the device as desired.

In another example, an auxiliary user input device may include two buttons that can be pressed alone or together to provide different input control signals to the connector. In this example, the setup control signal may indicate an internal mapping of the different button presses to the input control signal(s) provided to the connector. For example, pressing one of the two buttons may map a left direction, pressing the other of the two buttons may map to a right direction, pressing the two buttons together may map to an up direction and not pressing the two buttons may map to a down direction.

It will be appreciated that the setup control signal used by the internal microcontroller 308 to perform dynamic mapping may be received from any suitable source. In some implementations, the internal game controller 308 may receive a setup control signal from an auxiliary user input device, and the setup control signal may specify the particular characteristics of the user input device. In some implementations, the internal game controller 308 may receive a setup control signal from the physical game controller 100. In some implementations, the internal game controller 308 may receive a setup control signal from the computing device 101, via the physical game controller 100. For example, the computing device 101 may execute a configuration application that provides a graphical user interface configured to enable a user to customize the setup and mapping of the game controller 100 and/or the accessory apparatus 300.

The internal microcontroller 308 is further configured to send the mapped control signal to the game controller 100 via the apparatus connector 312. The integrated microcontroller 122 is configured to receive the mapped control signal from the accessory apparatus 300 via the accessory connector 120. The integrated microcontroller 122 is further configured to send the mapped control signals to the computing device 101 to control an application (e.g., video game) executed by the computing device 101. The mapped control signals, for a given physical control, may provide an output that is the same as what would be generated via normal operation of the physical control (i.e., without the use of an auxiliary user input device 306).

In this way, the auxiliary user input devices 306 may be used to provide user input that maps to the same functions as the physical controls 102 of the game controller 100. Such a configuration allows a user that is unable to, or prefers not to, manipulate the physical controls 102 of the game controller 100 to provide the same user input functionality in an alternative manner via the auxiliary user input devices 306. More particularly, the auxiliary input mechanisms enable alternate physical input devices, operated with different physical motions, to generate the same output signals from the physical controller as would occur during normal use.

The accessory apparatus 300 is shown in FIGS. 3-6 as including the auxiliary accessory connectors 302 and internal microcontroller 308 encased in a housing 304, with the housing being removable from the game controller 100. In some implementations, the components of the accessory apparatus 300 may be integrated into the game controller 100. In particular, in some implementations, the communication interface 103, physical controls 102, auxiliary accessory connectors 302, and internal microcontroller 308 are encased in a shared housing. In some such implementations, microcontrollers 122 and 308 may be combined into a single physical microcontroller to control operation of the game controller and connected auxiliary user input devices.

Figure 7:
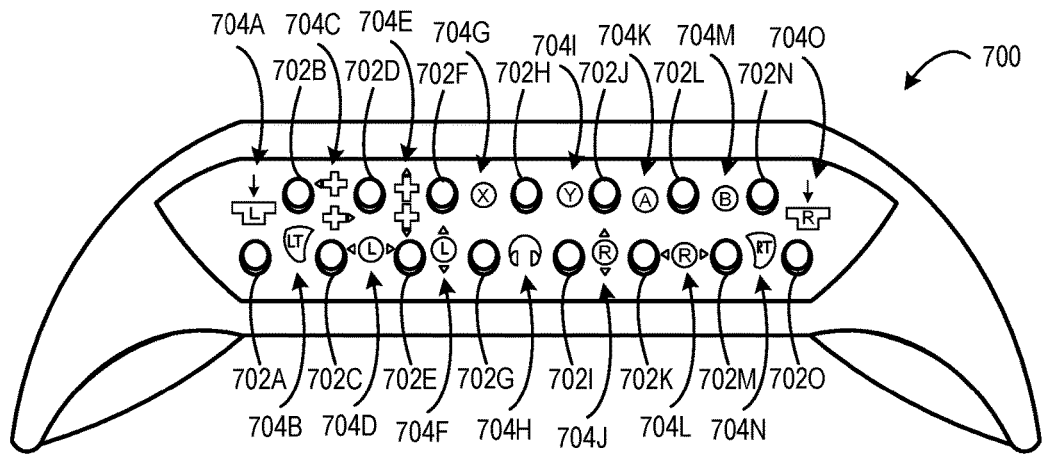
FIG. 7 shows an example accessory apparatus including visual indicators of control mappings between physical controls and/or other functions of a physical controller and auxiliary user input devices.

In some implementations, the accessory apparatus may include visual indicators or markings that visually identify a mapping of the auxiliary accessory connector to a physical control or other function of the physical controller. In other words, the visual markings indicate that when an input control signal is received from an auxiliary user input device connected to the auxiliary accessory connector, it is mapped to a mapped control signal associated with the physical control or other function, and therefore produces functionality as if the physical control or other function were normally operated directly on the controller. Specifically, a visual indicator can specify that a given auxiliary accessory connector is associated with a specific physical control on the physical controller. Further, a visual indicator can specify that a given auxiliary accessory connector is associated with a specific function of the physical controller. For example, the visual indicator that is a visual representation of a pair of headphones indicates that the corresponding auxiliary accessory connector is associated with an audio function. In other words, a pair of headphones could be connected to that auxiliary accessory connector to provide receive audio output and/or provide audio input via a microphone integrated into the pair of headphones. The visual indicators may help guide a user to plug in a particular user input device correctly so as to map it to a desired physical control of the game controller. FIG. 7 shows an example accessory apparatus 700 including a plurality of auxiliary accessory connectors 702 and associated visual indicators 704. Visual indicators 704A-704F identify mappings to physical controls on the left side of the game controller. In particular, visual indicator 704A is associated with connector 702A and indicates that connector 702A is mapped to depressing the left joystick of the game controller. Visual indicator 704B is associated with connector 702B and indicates that connector 702B is mapped to depressing the left trigger of the game controller. Visual indicator 704C is associated with connector 702C and indicates that connector 702C is mapped to depressing the left and right directions of the directional pad of the game controller. Visual indicator 704D is associated with connector 702D and indicates that connector 702D is mapped to moving the left joystick of the game controller in the left and right directions. Visual indicator 704E is associated with connector 702E and indicates that connector 702E is mapped depressing the left and right directions of the directional pad of the game controller. Visual indicator 704F is associated with connector 702F and indicates that connector 702F is mapped to moving the left joystick of the game controller in the up and down directions.

Visual indicators 704G-704O identify mappings to physical controls on the right side of the game controller. In particular, visual indicator 704G is associated with connector 702G and indicates that connector 702G is mapped to the "X" button of the game controller. Visual indicator 704H is associated with connector 702H and indicates that connector 702H is mapped to a headphone input jack of the game controller. In other words, a pair of headphones that is plugged into connector 702H may receive audio output from the game controller. Visual indicator 704I is associated with connector 702I and indicates that connector 702I is mapped to the "Y" button of the game controller. Visual indicator 704J is associated with connector 702J and indicates that connector 702J is mapped to moving the right joystick of the game controller in the up and down directions. Visual indicator 704K is associated with connector 702K and indicates that connector 702K is mapped to the "A" button of the game controller. Visual indicator 704L is associated with connector 702L and indicates that connector 702L is mapped to moving the right joystick of the game controller in the left and right directions. Visual indicator 704M is associated with connector 702M and indicates that connector 702M is mapped to the "B" button of the game controller. Visual indicator 704N is associated with connector 702N and indicates that connector 702N is mapped to depressing the left trigger of the game controller. Visual indicator 704O is associated with connector 702O and indicates that connector 702O is mapped to depressing the right joystick of the game controller.

Visual indicators may be displayed on the accessory apparatus in any suitable manner and may take any suitable form. In implementations where the accessory apparatus has a fixed mapping scheme, display of the visual indicators may be permanent, via paint, for example. In implementations where the accessory apparatus has a dynamic mapping scheme, display of the visual indicators may be dynamically changed. For example, each visual indicator may be visually presented on a display screen, and the display screen may change the visual indicators to reflect the current mapping of the auxiliary accessory connectors to physical controls or other functions of the physical controller.

Figure 8:
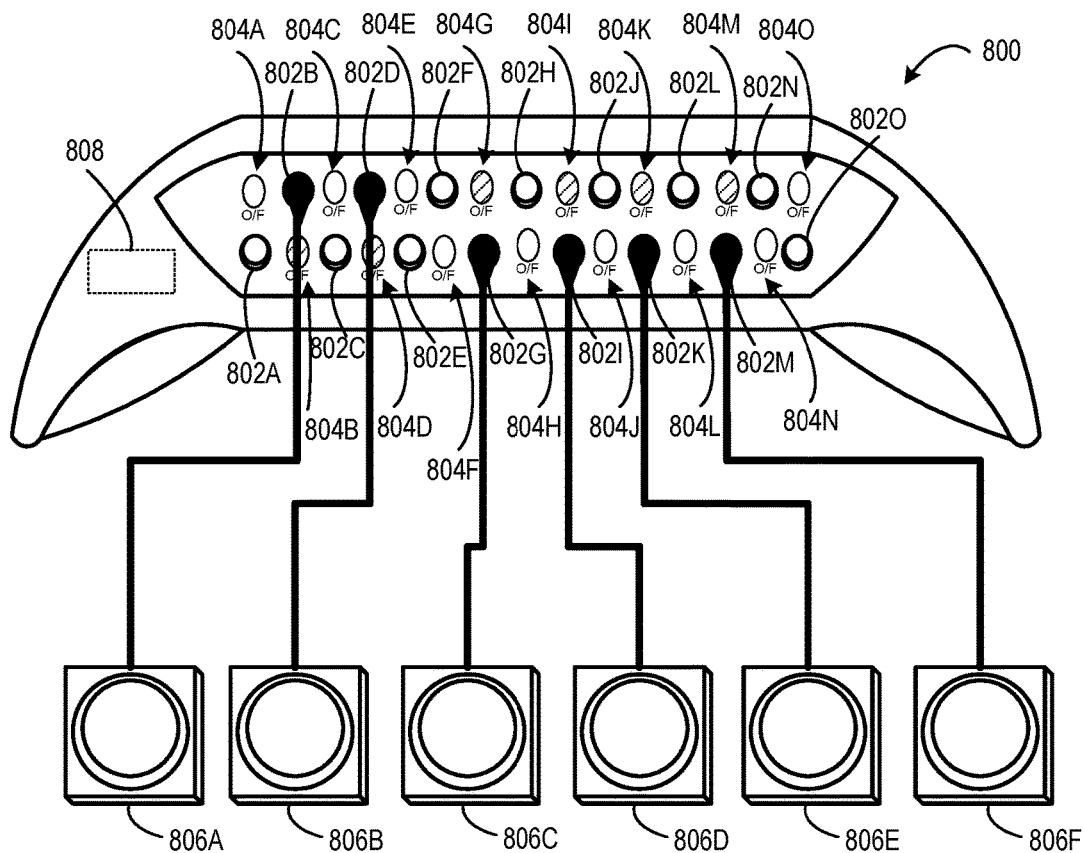
FIG. 8 shows an example accessory apparatus including on/off indicators that indicate active physical controls of a physical controller.

In some implementations, the accessory apparatus may include on/off indicators that visually identify which connectors are active for particular operating conditions of the physical controller. The on/off indicators may help guide a user to plug in auxiliary user input devices to a particular set of active auxiliary accessory connectors that is mapped to a corresponding set of physical controls or other functions of the physical controller that are active for the current operating condition. FIG. 8 shows an example accessory apparatus 800 including a plurality of auxiliary accessory connectors 802 (e.g., 802A-802O) and associated on/off indicators 804 (e.g., 804A-804O). The on/off indicators 804 are LEDs that are illuminated when a corresponding connector 802 is active to direct a user to plug in an auxiliary user input device to the connector 802. When a connector 802 is not active, then the corresponding on/off indicator 804 is not illuminated. In the illustrated example, on/off indicators 804B, 804D, 804G, 804I, 804K, and 804M are illuminated to indicate that the corresponding auxiliary accessory connectors 802B, 802D, 802G, 802I, 802K, and 802M are active. Accordingly, a user can recognize the set of active connectors and plug in a plurality of auxiliary user input devices 806 (e.g., 806A-806F) into the set of active connectors 802B, 802D, 802G, 802I, 802K, and 802M.

The set of active connectors may be determined by an internal microcontroller 808 based on any suitable operating condition. Further, the internal microcontroller 808 may adjust the illumination state of the on/off indicators 804 based on the determined set of active connectors 802. In one example, the internal microcontroller 808 is configured to receive a setup control signal from the physical controller that identifies the set of active connectors and/or active physical controls of the physical controller. The internal microcontroller 808 is further configured to activate the on/off indicators 804 associated with the set of active auxiliary accessory connectors 802 corresponding to each physical control of the set of active physical controls.

The setup control signal received from the physical controller may indicate a set of active auxiliary accessory connectors that is specific to a particular operating condition. In some implementations, the setup control signal identifies an application-specific set of active physical controls for a particular application executed by the computing device. In particular, different applications executed by the computing device may have different sets of physical controls that are actively used to control the application.

Figure 9A:
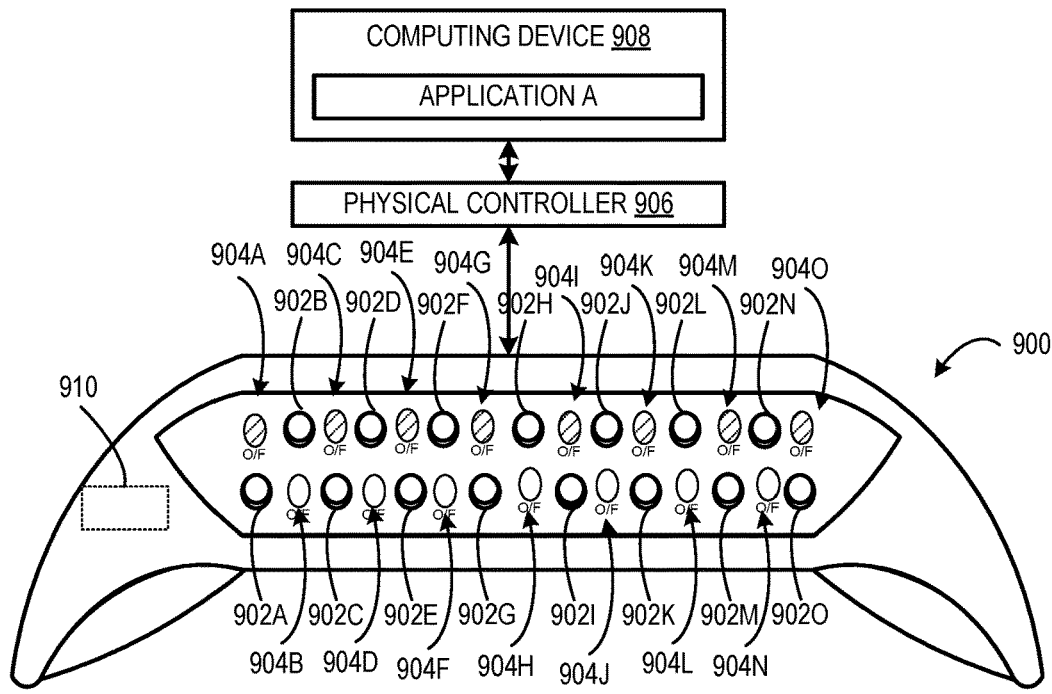
FIGS. 9A and 9B show the accessory apparatus of FIG. 8 with different on/off indicators activated to indicate different application-specific sets of active physical controls.
Figure 9B:
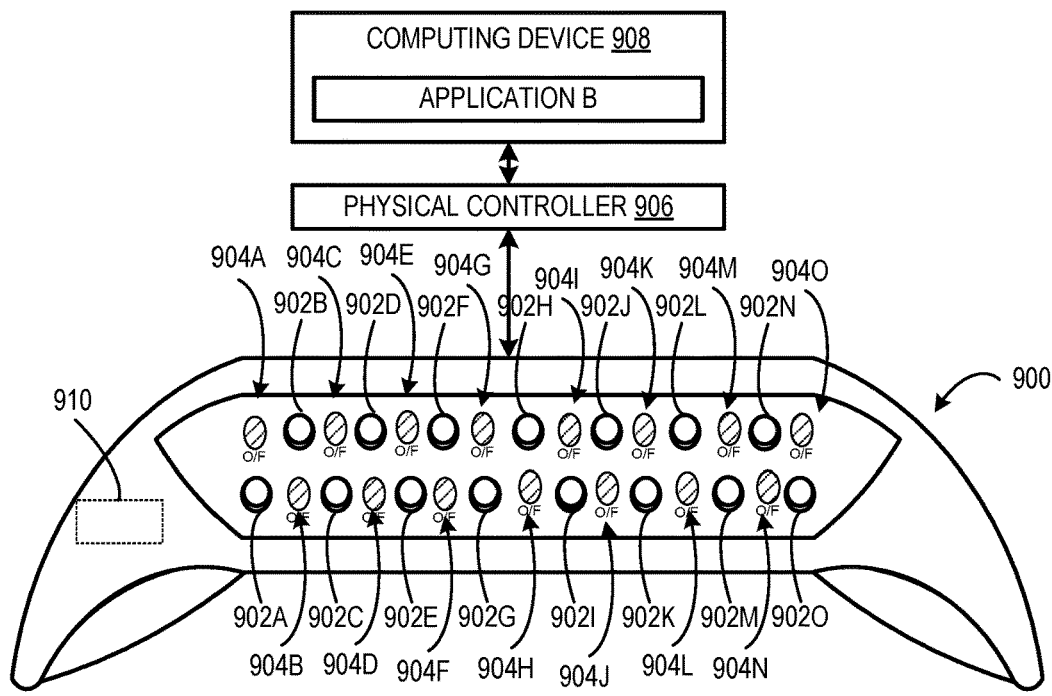

FIGS. 9A and 9B show examples of different application-specific sets of active connectors of an accessory apparatus that are active for different applications. In FIG. 9A, an accessory apparatus 900 includes a plurality of auxiliary accessory connectors 902 and a corresponding plurality of on/off indicators 904. The accessory apparatus 900 is communicatively coupled to a physical controller 906. The physical controller 906 is in communication with a computing device 908 that executes an application A. The computing device 908 provides a setup control signal to the physical controller 906 that indicates the set of active physical controls that are used to control the application A. The physical controller 906 forwards the setup control signal to an internal microcontroller 910 of the accessory apparatus 900. The internal microcontroller 910 receives the setup control signal from the physical controller 906, and activates a set of on/off indicators 904A, 904C, 904D, 904F, 904I, 904K, 904M and 904O corresponding to the application-specific set of active connectors 902A, 902C, 902D, 902F, 902I, 902K, 902M and 902O based on the setup control signal. In this scenario, the on/off indicators enable a user to identify which connectors are active and plug in auxiliary user input devices into the appropriate connectors to control the application A.

In FIG. 9B, the computing device 908 executes an application B, and provides a setup control signal to the physical controller 906 that indicates the set of active physical controls that are used to control the application B. The physical controller 906 forwards the setup control signal to the internal microcontroller 910 of the accessory apparatus 900. The internal microcontroller 910 receives the setup control signal from the physical controller 906, and activates a set of on/off indicators 904A-904O corresponding to the application-specific set of active connectors 902A-902O based on the setup control signal. In this scenario, the on/off indicators enable a user to identify which connectors are active and plug in auxiliary user input devices into the appropriate connectors to control the application B.

In some implementations, the setup control signal identifies a user-specific set of active physical controls for a particular user profile that is interacting with the computing device and/or the physical controller. For example, different users may have different physical capabilities that effect different levels of control of the computing device.

Figure 9C:
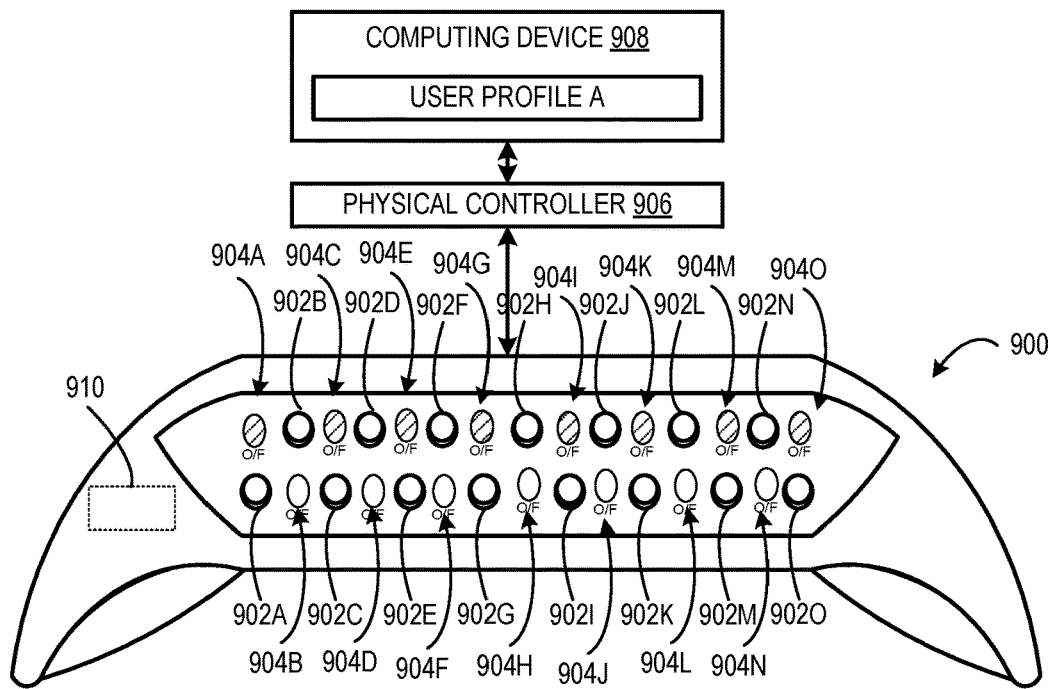
FIGS. 9C and 9D show the accessory apparatus of FIG. 8 with different on/off indicators activated to indicate different user-specific sets of active physical controls.
Figure 9D:
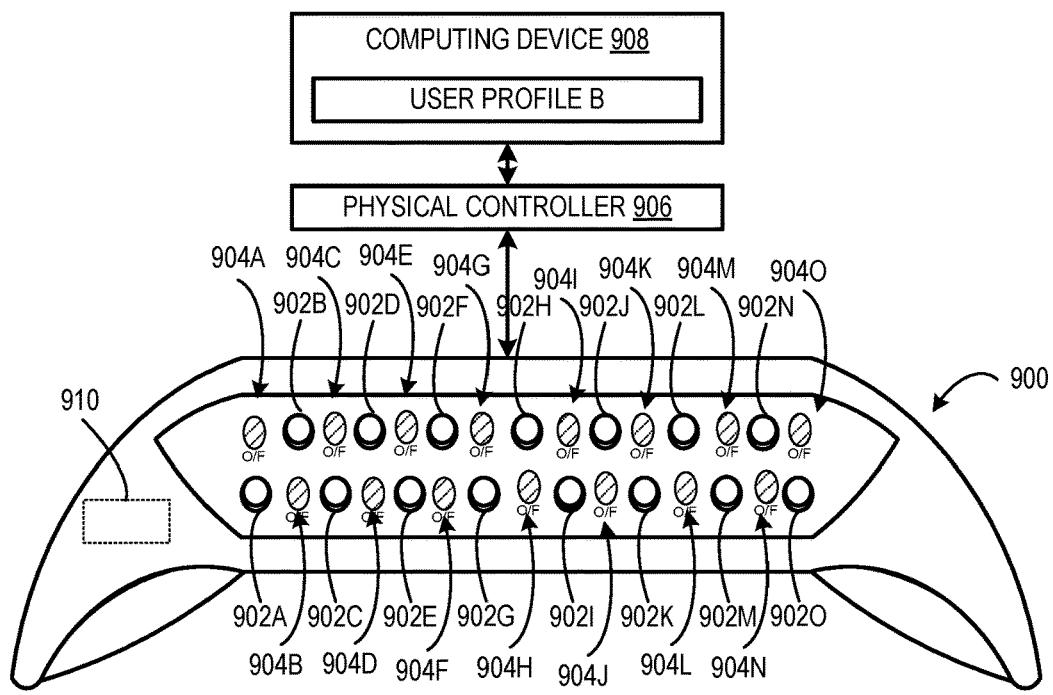

FIGS. 9C and 9D show examples of different user-specific sets of active connectors of the accessory apparatus 900 that are active for different users. In FIG. 9C, a user profile A associated with a user A is active on computing device 908. The user profile A may specify user input and control preferences and other information specific to user A. The computing device 908 provides a setup control signal to the physical controller 906. The setup control signal identifies a set of active physical controls that are specified in the user profile A and used by user A to control the computing device 908. The physical controller 906 forwards the setup control signal to the internal microcontroller 910 of the accessory apparatus 900. The internal microcontroller 910 receives the setup control signal from the physical controller 906, and activates a set of on/off indicators 904A, 904C, 904D, 904F, 904I, 904K, 904M and 904O corresponding to the user-specific set of active connectors 902A, 902C, 902D, 902F, 902I, 902K, 902M and 902O that are specific to user A based on the setup control signal. In this scenario, the on/off indicators enable the user A to identify which connectors are active and plug in auxiliary user input devices into the appropriate connectors to control the computing device 908 according to his preferred control scheme.

In FIG. 9D, a user profile B associated with a user B is active on computing device 908. The user profile B may specify user input and control preferences and other information specific to user B. The computing device 908 provides a setup control signal to the physical controller 906. The setup control signal identifies the set of active physical controls that are specified in the user profile B and used by user B to control the computing device 908. The physical controller 906 forwards the setup control signal to the internal microcontroller 910 of the accessory apparatus 900. The internal microcontroller 910 receives the setup control signal from the physical controller 906, and activates a set of on/off indicators 904A-904O corresponding to the user-specific set of active connectors 902A-902O that are specific to user B based on the setup control signal. In this scenario, the on/off indicators enable the user B to identify which connectors are active and plug in auxiliary user input devices into the appropriate connectors to control the computing device 908 according to his preferred control scheme.

In some implementations, the accessory apparatus may be configured to detect a set of active auxiliary accessory connectors, and map input control signals differently based on the particular active auxiliary accessory connectors included in the set. In one example, if all of the connectors are active, then the internal microcontroller may map the auxiliary input devices 1:1 with the physical controls of the physical controller. In another example, if half of the connectors are active, then the internal microcontroller may prioritize the joysticks and buttons over the triggers and the different directions of the directional pad when mapping the auxiliary user input devices to the physical controls of the physical controller. These examples are meant to be non-limiting, and the internal microcontroller may map any suitable active connector to any suitable physical control of the physical controller based on the particular connectors included in the set.

In some implementations, the internal microcontroller may be configured to map the active set of connectors to different physical controls further based on an operating condition. In some implementations, the mapping may be based on a specific application that is being executed on the computing device in communication with the physical controller. FIGS. 10A and 10B show examples of a set of active connectors of an accessory apparatus being mapped to different physical controls of a physical controller based on different applications being executed by a computing device. In FIG. 10A, an accessory apparatus 1000 includes an active set of auxiliary accessory connectors 1002 (e.g., 1002A, 1002B, 1002C, 1002D, 1002E, 1002F) connected to a corresponding set of auxiliary user input devices 1004 (e.g., 1004A, 1004B, 1004C, 1004D, 1004E, 1004F). An internal microcontroller 1006 detects the set of active connectors 1002. The accessory apparatus 1000 is communicatively coupled to a physical controller 1008. The physical controller 1008 is in communication with a computing device 1010 that executes an application A. The computing device 1010 provides a setup control signal to the physical controller 1008. The setup control signal identifies a set of active physical controls of the physical controller 1008 that are used to control the application A. The physical controller 1008 forwards the setup control signal to the internal microcontroller 1006 of the accessory apparatus 1000. The internal microcontroller 1006 is further configured to dynamically map the set of active connectors 1002 and/or the connected auxiliary user input devices 1004 to the set of active physical controls of the physical controller 1008 based on the setup control signal. In particular, the auxiliary user input device 1004A is mapped to the "UP" input of the directional pad; the auxiliary user input device 1004B is mapped to the "DOWN" input of the directional pad; the auxiliary user input device 1004C is mapped to the "A" button; the auxiliary user input device 1004D is mapped to the "B" button; the auxiliary user input device 1004E is mapped to the "X" button; and the auxiliary user input device 1004F is mapped to the "Y" button.

In FIG. 10B, the computing device 1010 executes an application B, and provides a setup control signal to the physical controller 1008. The setup control signal indicates the set of active physical controls of the physical controller 1008 that are used to control the application B. The physical controller 1008 forwards the setup control signal to the internal microcontroller 1006 of the accessory apparatus 1000. The internal microcontroller 1006 is further configured to dynamically map the set of active connectors 1002 and/or the connected auxiliary user input devices 1004 to the set of active physical controls of the physical controller 1008 based on the setup control signal. In particular, the auxiliary user input device 1004A is mapped to the left trigger; the auxiliary user input device 1004B is mapped to the right trigger; the auxiliary user input device 1004C is mapped to the "UP" input of the directional pad; the auxiliary user input device 1004D is mapped to the "down" input of the directional pad; the auxiliary user input device 1004E is mapped to the "LEFT" input of the directional pad; and the auxiliary user input device 1004F is mapped to the "RIGHT" input of the directional pad. Such different mappings may be based on the particular control requirements of the applications A and B.

In some implementations, the mapping may be based on a specific user profile of a user that is interacting with the computing device and/or the physical controller. FIGS. 10C and 10D show examples of a set of active connectors of an accessory apparatus being mapped to different physical controls of a physical controller based on different active user profiles of different users that are interacting with the computing device and/or the physical controller. For example, different users may have different physical capabilities that effect different levels of control of the computing device.

In FIG. 10C, a user profile A associated with a user A is active on computing device 1010. The user profile A may specify user input and control preferences and other information specific to user A. The computing device 1010 provides a setup control signal to the physical controller 1008. The setup control signal identifies a set of active physical controls that are specified in the user profile A and used by user A to control the computing device 1010. The physical controller 1008 forwards the setup control signal to the internal microcontroller 1006 of the accessory apparatus 1000. The internal microcontroller 1006 is further configured to dynamically map the set of active connectors 1002 and/or the connected auxiliary user input devices 1004 to the set of active physical controls of the physical controller 1008 based on the setup control signal. In particular, the auxiliary user input device 1004A is mapped to the "UP" input of the directional pad; the auxiliary user input device 1004B is mapped to the "DOWN" input of the directional pad; the auxiliary user input device 1004C is mapped to the "LEFT" input of the directional pad; the auxiliary user input device 1004D is mapped to the "RIGHT" input of the directional pad; the auxiliary user input device 1004E is mapped to the "A" button; and the auxiliary user input device 1004F is mapped to the "B" button.

In FIG. 10D, a user profile B associated with a user B is active on computing device 1010. The user profile B may specify user input and control preferences and other information specific to user B. Such preferences may be different than that of user A including a different set of physical controls used by user B to interact with the computing device 1010. The computing device 1010 provides a setup control signal to the physical controller 1008. The setup control signal identifies a set of active physical controls that are specified in the user profile B and used by user B to control the computing device 1010. The physical controller 1008 forwards the setup control signal to the internal microcontroller 1006 of the accessory apparatus 1000. The internal microcontroller 1006 is further configured to dynamically map the set of active connectors 1002 and/or the connected auxiliary user input devices 1004 to the set of active physical controls of the physical controller 1008 based on the setup control signal. In particular, the auxiliary user input device 1004A is mapped to the left trigger; the auxiliary user input device 1004B is mapped to the right trigger; the auxiliary user input device 1004C is mapped to the "A" button; the auxiliary user input device 1004D is mapped to the "B" button; the auxiliary user input device 1004E is mapped to the "X" button; and the auxiliary user input device 1004F is mapped to the "Y" button. Such different mappings may be based on the particular control requirements/preferences of the users A and B as specified in the associated user profiles. Any suitable set of auxiliary user input devices may be mapped to any corresponding set of physical controls of a physical controller based on a user profile of a user.

Based on such mappings, when the internal microcontroller 1006 receives an input control signal from an auxiliary user input device operatively connected to a selected active auxiliary accessory connector, the internal microcontroller 1006 maps the input control signal to a mapped control signal corresponding to a selected physical control of the set of physical controls that is mapped to the selected auxiliary accessory connector, and sends the mapped control signal to the computing device via the communication interface to control the application.

In some implementations, the internal microcontroller of the accessory apparatus may be configured to map the set active auxiliary accessory connectors to a corresponding set of physical controls of the plurality of physical controls of the physical controller based on one or more of an application being executed on the computing device and a user profile of a particular user interacting with the computing device.

In the above described examples, the internal microcontroller of the accessory apparatus is configured to perform the mapping operations. Alternatively or additionally, in some implementations, the integrated microcontroller of the physical controller may be configured to perform such mapping operations. For example, the integrated microcontroller may be configured to perform such mapping operations when the auxiliary accessory connectors are integrated into the physical controller.

It will be appreciated that the concepts described herein are applicable to any type of physical controller or user input device that has physical controls that are required to be operated in a particular way. In particular, the apparatus accessory may enable the same controls signals that would be generated through physical manipulation of such physical controls to be alternatively generated through different physical devices and different physical actions.

In an example, an accessory apparatus comprises a housing, an internal microcontroller contained within the housing, an apparatus connector encased in the housing and exposed to an exterior environment, and a plurality of auxiliary accessory connectors encased in the housing and exposed to the exterior environment. The apparatus connector is configured to mate with a corresponding accessory connector of a physical controller to electrically connect the internal microcontroller to the physical controller. The physical controller has a plurality of physical controls for triggering signals to control an application executed by a computing device. Each auxiliary accessory connector is configured to enable a separate auxiliary user input device to operatively connect to the accessory apparatus and electrically connect with the internal microcontroller. The internal microcontroller is configured to (1) receive an input control signal from an auxiliary user input device operatively connected to an auxiliary accessory connector of the plurality of auxiliary accessory connectors, (2) map the input control signal to a mapped control signal corresponding to a physical control of the plurality of physical controls, and (3) send the mapped control signal to the physical controller via the apparatus connector. In this example and/or other examples, the apparatus connector may be further configured to removably affix the accessory apparatus to the physical controller. In this example and/or other examples, the plurality of auxiliary accessory connectors may be configured to enable a plurality of auxiliary user input devices to operatively connect to the accessory apparatus such that the plurality of auxiliary user input devices map to different mapped control signals corresponding to different physical controls of the physical controller. In this example and/or other examples, the accessory apparatus may further comprise a visual indicator associated with each auxiliary accessory connector of the plurality of auxiliary accessory connectors, each visual indicator being configured to identify a mapped control signal to which an input control signal received via the auxiliary accessory connector is mapped by the internal microcontroller. In this example and/or other examples, the accessory apparatus may further comprise an on/off indicator associated with each auxiliary accessory connector of the plurality of auxiliary accessory connectors and operatively connected to the internal microcontroller, and the internal microcontroller maybe further configured to (1) receive a setup control signal from the physical controller that identifies a set of active physical controls of the plurality of physical controls, and (2) activate the on/off indicators associated with the auxiliary accessory connectors corresponding to each physical control of the set of active physical controls. In this example and/or other examples, the setup control signal may identify an application-specific set of active physical controls for a particular application executed by the computing device. In this example and/or other examples, the setup control signal may identify a user-specific set of active physical controls for a particular user. In this example and/or other examples, the internal microcontroller may be further configured to detect a set of active auxiliary accessory connectors of the plurality of auxiliary accessory connectors that are operatively connected to auxiliary user input devices, and the internal microcontroller may be configured to map input control signals that are received via active auxiliary accessory connectors differently based on the particular active auxiliary accessory connectors included in the set of active auxiliary accessory connectors. In this example and/or other examples, the microcontroller may be further configured to map input control signals that are received via active auxiliary accessory connectors of the set based on a particular application being executed on the computing device. In this example and/or other examples, the microcontroller may be further configured to map input control signals that are received via active auxiliary accessory connectors of the set based on a user profile of a particular user. In this example and/or other examples, the internal microcontroller may be further configured to (1) receive, via an auxiliary accessory connector, a setup control signal from an auxiliary user input device, and (2) map subsequently-received input control signals from the auxiliary user input device based on the setup control signal.

In an example, a physical controller, comprises a communication interface configured to communicatively couple the physical controller with a computing device executing an application a plurality of physical controls, each physical control of the plurality of physical controls being configured to generate one or more control signals responsive to physical manipulation by a user, a plurality of auxiliary accessory connectors, each auxiliary accessory connector being configured to enable a separate auxiliary user input device to operatively connect to the physical controller; and an internal microcontroller configured to: (1) receive an input control signal from an auxiliary user input device operatively connected to an auxiliary accessory connector of the plurality of auxiliary accessory connectors, (2) map the input control signal to a mapped control signal corresponding to a physical control of the plurality of physical controls, and (3) send the mapped control signal to the computing device via the communication interface to control the application. In this example and/or other examples, the communication interface, the plurality of physical controls, the plurality of auxiliary accessory connectors, and the internal microcontroller may be encased in a shared housing. In this example and/or other examples, the plurality of auxiliary accessory connectors and the internal microcontroller may be encased in a housing of an accessory apparatus that is removable from the physical controller. In this example and/or other examples, the internal microcontroller may be an accessory microcontroller, the physical controller may further include an integrated microcontroller, the accessory microcontroller may be configured to send the mapped control signal to the integrated microcontroller, and the integrated microcontroller may be configured to send the mapped control signal to the computing device via the communication interface to control the application. In this example and/or other examples, the physical controller may further comprise an on/off indicator associated with each auxiliary accessory connector of the plurality of auxiliary accessory connectors and operatively connected to the accessory microcontroller, and the accessory microcontroller may be further configured to (1) receive a setup control signal from the integrated microcontroller that identifies a set of active physical controls, and (2) activate the on/off indicators associated with the auxiliary accessory connectors corresponding to each active physical control of the set of active physical controls. In this example and/or other examples, the internal microcontroller may be further configured to detect a set of active auxiliary accessory connectors of the plurality of auxiliary accessory connectors that are operatively connected to auxiliary user input devices, and the internal microcontroller may be configured to map input control signals that are received via active auxiliary accessory connectors differently based on the particular active auxiliary accessory connectors included in the set of active auxiliary accessory connectors. In this example and/or other examples, the internal microcontroller may be further configured to map input control signals that are received via active auxiliary accessory connectors of the set based on a particular application being executed by the computing device in communication with the physical controller. In this example and/or other examples, the internal microcontroller may be further configured to map input control signals that are received via active auxiliary accessory connectors of the set based on a user profile of a particular user.

In an example a physical controller comprises a communication interface configured to communicatively couple the physical controller with a computing device to control an application executed by the computing device, a plurality of physical controls, each physical control of the plurality of physical controls being configured to generate one or more control signals based upon physical manipulation by a user, a plurality of auxiliary accessory connectors, each auxiliary accessory connector being configured to enable a separate auxiliary user input device to operatively connect to the physical controller, and an internal microcontroller configured to: (1) detect a set of active auxiliary accessory connectors of the plurality of auxiliary accessory connectors that are operatively connected to auxiliary user input devices, (2) map the set active auxiliary accessory connectors to a corresponding set of physical controls of the plurality of physical controls of the physical controller based on one or more of the application being executed on the computing device and a user profile of a particular user, (3) receive an input control signal from an auxiliary user input device operatively connected to a selected active auxiliary accessory connector, (4) map the input control signal to a mapped control signal corresponding to a selected physical control of the set of physical controls that is mapped to the selected auxiliary accessory connector, and (5) send the mapped control signal to the computing device via the communication interface to control the application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An accessory apparatus, comprising:
   a housing;
   an internal microcontroller contained within the housing;
   an apparatus connector encased in the housing and exposed to an exterior environment, the apparatus connector being configured to mate with a corresponding accessory connector of a physical controller to electrically connect the internal microcontroller to the physical controller, the physical controller having a plurality of physical controls for triggering signals to control an application executed by a computing device;
   a plurality of auxiliary accessory connectors encased in the housing and exposed to the exterior environment, each auxiliary accessory connector being configured to enable a separate auxiliary user input device to operatively connect to the accessory apparatus and electrically connect with the internal microcontroller; and
   wherein the internal microcontroller is configured to:
   (1) receive an input control signal from an auxiliary user input device operatively connected to an auxiliary accessory connector of the plurality of auxiliary accessory connectors,
   (2) map the input control signal to a mapped control signal corresponding to a physical control of the plurality of physical controls, and
   (3) send the mapped control signal to the physical controller via the apparatus connector.

2. The accessory apparatus of claim 1, wherein the apparatus connector is further configured to removably affix the accessory apparatus to the physical controller.

3. The accessory apparatus of claim 1, wherein the plurality of auxiliary accessory connectors is configured to enable a plurality of auxiliary user input devices to operatively connect to the accessory apparatus such that the plurality of auxiliary user input devices map to different mapped control signals corresponding to different physical controls of the physical controller.

4. The accessory apparatus of claim 3, further comprising:
   a visual indicator associated with each auxiliary accessory connector of the plurality of auxiliary accessory connectors, each visual indicator being configured to identify a mapped control signal to which an input control signal received via the auxiliary accessory connector is mapped by the internal microcontroller.

5. The accessory apparatus of claim 1, further comprising:
   an on/off indicator associated with each auxiliary accessory connector of the plurality of auxiliary accessory connectors and operatively connected to the internal microcontroller, and wherein the internal microcontroller is further configured to (1) receive a setup control signal from the physical controller that identifies a set of active physical controls of the plurality of physical controls, and (2) activate the on/off indicators associated with the auxiliary accessory connectors corresponding to each physical control of the set of active physical controls.

6. The accessory apparatus of claim 5, wherein the setup control signal identifies an application-specific set of active physical controls for a particular application executed by the computing device.

7. The accessory apparatus of claim 5, wherein the setup control signal identifies a user-specific set of active physical controls for a particular user.

8. The accessory apparatus of claim 1, wherein the internal microcontroller is further configured to detect a set of active auxiliary accessory connectors of the plurality of auxiliary accessory connectors that are operatively connected to auxiliary user input devices, and wherein the internal microcontroller is configured to map input control signals that are received via active auxiliary accessory connectors differently based on the particular active auxiliary accessory connectors included in the set of active auxiliary accessory connectors.

9. The accessory apparatus of claim 8, wherein the microcontroller is further configured to map input control signals that are received via active auxiliary accessory connectors of the set based on a particular application being executed on the computing device.

10. The accessory apparatus of claim 8, wherein the microcontroller is further configured to map input control signals that are received via active auxiliary accessory connectors of the set based on a user profile of a particular user.

11. The accessory apparatus of claim 1, wherein the internal microcontroller is further configured to (1) receive, via an auxiliary accessory connector, a setup control signal from an auxiliary user input device, and (2) map subsequently-received input control signals from the auxiliary user input device based on the setup control signal.

12. A physical controller, comprising:
a communication interface configured to communicatively couple the physical controller with a computing device executing an application;
a plurality of physical controls, each physical control of the plurality of physical controls being configured to generate one or more control signals to control the application executed by the computing device responsive to physical manipulation by a user;
a plurality of auxiliary accessory connectors, each auxiliary accessory connector being configured to enable a separate auxiliary user input device to operatively connect to the physical controller; and
an internal microcontroller configured to:
(1) detect physical manipulation of a physical control of the plurality of physical controls,
(2) send a control signal corresponding to the physical control to the computing device via the communication interface to control the application,
(3) receive an input control signal from an auxiliary user input device operatively connected to an auxiliary accessory connector of the plurality of auxiliary accessory connectors,
(4) map the input control signal to the control signal corresponding to the physical control of the plurality of physical controls, and
(5) send the control signal to the computing device via the communication interface to control the application.

13. The physical controller of claim 12, wherein the communication interface, the plurality of physical controls, the plurality of auxiliary accessory connectors, and the internal microcontroller are encased in a shared housing.

14. The physical controller of claim 12, wherein the plurality of auxiliary accessory connectors and the internal microcontroller are encased in a housing of an accessory apparatus that is removable from the physical controller.

15. The physical controller of claim 14, wherein the internal microcontroller is an accessory microcontroller, wherein the physical controller further includes an integrated microcontroller, wherein the accessory microcontroller is configured to send the control signal to the integrated microcontroller, and wherein the integrated microcontroller is configured to send the control signal to the computing device via the communication interface to control the application.

16. The physical controller of claim 15, further comprising:
an on/off indicator associated with each auxiliary accessory connector of the plurality of auxiliary accessory connectors and operatively connected to the accessory microcontroller, and wherein the accessory microcontroller is further configured to (1) receive a setup control signal from the integrated microcontroller that identifies a set of active physical controls, and (2) activate the on/off indicators associated with the auxiliary accessory connectors corresponding to each active physical control of the set of active physical controls.

17. The physical controller of claim 12, wherein the internal microcontroller is further configured to detect a set of active auxiliary accessory connectors of the plurality of auxiliary accessory connectors that are operatively connected to auxiliary user input devices, and wherein the internal microcontroller is configured to map input control signals that are received via active auxiliary accessory connectors differently based on the particular active auxiliary accessory connectors included in the set of active auxiliary accessory connectors.

18. The physical controller of claim 17, wherein the internal microcontroller is further configured to map input control signals that are received via active auxiliary accessory connectors of the set based on a particular application being executed by the computing device in communication with the physical controller.

19. The physical controller of claim 17, wherein the internal microcontroller is further configured to map input control signals that are received via active auxiliary accessory connectors of the set based on a user profile of a particular user.

20. A physical controller, comprising:
a communication interface configured to communicatively couple the physical controller with a computing device to control an application executed by the computing device;
a plurality of physical controls, each physical control of the plurality of physical controls being configured to generate one or more control signals to control the application executed by the computing device based upon physical manipulation by a user;
a plurality of auxiliary accessory connectors, each auxiliary accessory connector being configured to enable a separate auxiliary user input device to operatively connect to the physical controller; and
an internal microcontroller configured to:
(1) detect physical manipulation of a physical control of the plurality of physical controls,
(2) send a control signal corresponding to the physical control to the computing device via the communication interface to control the application,
(3) detect a set of active auxiliary accessory connectors of the plurality of auxiliary accessory connectors that are operatively connected to auxiliary user input devices,
(4) map the set active auxiliary accessory connectors to a corresponding set of physical controls of the plurality of physical controls of the physical controller,
(5) receive an input control signal from an auxiliary user input device operatively connected to a selected active auxiliary accessory connector,
(6) map the input control signal to the control signal corresponding to the physical control of the set of physical controls that is mapped to the selected auxiliary accessory connector, and
(7) send the control signal to the computing device via the communication interface to control the application.

* * * * *